United States Patent
Harter et al.

(10) Patent No.: US 10,083,549 B2
(45) Date of Patent: Sep. 25, 2018

(54) DRIVER COMPLIANCE MACHINE FOR MONITORING MULTIPLE OPERATORS

(71) Applicant: J. J. Keller & Associates, Inc., Neenah, WI (US)

(72) Inventors: Tom C. Harter, Neenah, WI (US); Michael K. Kuphal, Greenville, WI (US); Randel J. Thome, Oshkosh, WI (US); Bruce D. Lightner, La Jolla, CA (US)

(73) Assignee: J. J. Keller & Associates, Inc., Neenah, WI (US)

( * ) Notice: Subject to any disclaimer, the term of this patent is extended or adjusted under 35 U.S.C. 154(b) by 23 days.

(21) Appl. No.: 15/491,700

(22) Filed: Apr. 19, 2017

(65) Prior Publication Data

US 2017/0221278 A1 Aug. 3, 2017

Related U.S. Application Data

(60) Division of application No. 14/550,486, filed on Nov. 21, 2014, which is a continuation of application No.
(Continued)

(51) Int. Cl.
*G05D 1/00* (2006.01)
*G05D 3/00* (2006.01)
(Continued)

(52) U.S. Cl.
CPC ............. *G07C 5/008* (2013.01); *B60W 40/09* (2013.01); *G01S 19/52* (2013.01); *G07C 5/02* (2013.01);
(Continued)

(58) Field of Classification Search
CPC ........ G07C 5/008; G07C 5/02; G07C 5/0841; B60W 40/09; G01S 19/52
(Continued)

(56) References Cited

U.S. PATENT DOCUMENTS

| 5,541,840 A | 7/1996 | Gurne et al. |
| 5,623,403 A | 4/1997 | Highbloom |

(Continued)

OTHER PUBLICATIONS

Big Road, "BigRoad Driver App with Dashlink (AOBRD) Connection", BigRoad Driver Instruction Card, http://blog.bigroad.com/blog/introducing-dashlink-bigroads-engine-connected-solution, 2 pages.
(Continued)

*Primary Examiner* — Mahmoud S Ismail
(74) *Attorney, Agent, or Firm* — Michael Best & Friedrich LLP

(57) ABSTRACT

A base unit installed in a vehicle including a vehicle communication module for communicating with a controller, the controller monitoring at least one operating parameter of the vehicle. The base unit also includes a transceiver and a processor configured to receive the at least one operating parameter of the vehicle from the vehicle communication module. A memory device stores a first threshold of the vehicle operating parameter associated with a first vehicle operator, and stores a second threshold of the vehicle operating parameter associated with a second vehicle operator. The second threshold is greater than the first threshold. The processor is configured to determine that a driving event has occurred when first threshold has been exceeded for the first driver but the second threshold has not been exceeded for the second driver.

22 Claims, 5 Drawing Sheets

Related U.S. Application Data

14/108,795, filed on Dec. 17, 2013, now Pat. No. 9,235,936.

(51) Int. Cl.

| | | |
|---|---|---|
| *G06F 7/00* | (2006.01) | |
| *G06F 17/00* | (2006.01) | |
| *G07C 5/00* | (2006.01) | |
| *G07C 5/02* | (2006.01) | |
| *G07C 5/08* | (2006.01) | |
| *B60W 40/09* | (2012.01) | |
| *G01S 19/52* | (2010.01) | |
| *G01M 17/00* | (2006.01) | |
| *G06F 19/00* | (2018.01) | |
| *G06F 11/30* | (2006.01) | |

(52) U.S. Cl.
CPC ............ *G07C 5/085* (2013.01); *G07C 5/0841* (2013.01); *B60W 2510/18* (2013.01); *B60W 2520/04* (2013.01); *B60W 2520/10* (2013.01); *B60W 2540/30* (2013.01)

(58) Field of Classification Search
USPC ...................................................... 701/1, 29.6
See application file for complete search history.

(56) References Cited

U.S. PATENT DOCUMENTS

| | | | |
|---|---|---|---|
| 5,633,622 A | 5/1997 | Patterson | |
| 5,680,328 A | 10/1997 | Skorupski et al. | |
| 5,893,893 A | 4/1999 | Holt et al. | |
| 5,974,349 A | 10/1999 | Levine | |
| 6,181,992 B1 | 1/2001 | Gurne et al. | |
| 6,253,129 B1 | 6/2001 | Jenkins et al. | |
| 6,259,354 B1 | 7/2001 | Underwood | |
| 6,317,668 B1 | 11/2001 | Thibault | |
| 6,351,695 B1 | 2/2002 | Weiss | |
| 6,408,232 B1 | 6/2002 | Cannon et al. | |
| 6,421,590 B2 | 7/2002 | Thibault | |
| 6,430,496 B1 | 8/2002 | Smith et al. | |
| 6,526,341 B1* | 2/2003 | Bird ...................... | G07C 5/008 340/573.1 |
| 6,542,077 B2 | 4/2003 | Joao | |
| 6,587,046 B2 | 7/2003 | Joao | |
| 6,622,083 B1 | 9/2003 | Knockeart et al. | |
| 6,681,987 B1 | 1/2004 | Ford | |
| 6,690,260 B1 | 2/2004 | Ashihara | |
| 6,694,248 B2 | 2/2004 | Smith et al. | |
| 6,718,239 B2 | 4/2004 | Rayner | |
| 6,795,759 B2 | 9/2004 | Doyle | |
| 6,807,481 B1 | 10/2004 | Gastelum | |
| 6,812,888 B2 | 11/2004 | Drury et al. | |
| 6,842,762 B2 | 1/2005 | Raithel et al. | |
| 6,847,873 B1 | 1/2005 | Li | |
| 6,856,879 B2 | 2/2005 | Arakawa et al. | |
| 7,072,746 B1 | 7/2006 | Burch | |
| 7,117,075 B1* | 10/2006 | Larschan ............... | G06Q 10/06 701/29.6 |
| 8,400,296 B2 | 3/2013 | Brinton et al. | |
| 8,442,508 B2 | 5/2013 | Harter et al. | |
| 8,626,568 B2 | 1/2014 | Warkentin et al. | |
| 2001/0010028 A1 | 7/2001 | Thibault | |
| 2002/0035421 A1 | 3/2002 | Warkentin | |
| 2002/0133275 A1 | 9/2002 | Thibault | |
| 2002/0183920 A1 | 12/2002 | Smith et al. | |
| 2002/0195503 A1 | 12/2002 | Allen, Jr. et al. | |
| 2003/0071899 A1 | 4/2003 | Joao | |
| 2003/0130774 A1 | 7/2003 | Tripathi et al. | |
| 2005/0171692 A1 | 8/2005 | Hamblen et al. | |
| 2011/0238300 A1 | 9/2011 | Schenken | |
| 2013/0226397 A1 | 4/2013 | Kuphal et al. | |
| 2014/0032085 A1 | 1/2014 | Free et al. | |
| 2014/0046570 A1 | 2/2014 | Mohn et al. | |
| 2014/0085470 A1 | 5/2014 | Sako | |
| 2014/0122187 A1 | 5/2014 | Warkentin et al. | |
| 2015/0170433 A1 | 6/2015 | Harter et al. | |

OTHER PUBLICATIONS

Big Road, "DashLink Install Guide", http://www.bigroad.com/dashlink, 10 pages, (2015).

News Archives, Turnpike Global Technologies, 2007, Retrieved from Internet using waybackmachine.org, Dec. 25, 2007 <URL: http://web.archive.org/web/20071225141544/http://www.turnpikeglobal.com/news_archives/>.

"EOBR connects to handhelds," Fleet Owner, Jun. 1, 2006, Retrieved from Internet using waybackmachine.org, Feb. 14, 2008 <URL: http://web.archive.org/web/20080214083431/http://fleetowner.com/mag/fleet_eobr_connects_handhelds/index.html>.

Office Action from Canadian Intellectual Property Office for Application No. 2,619,126 dated Jun. 6, 2014 (4 pages).

Office Action from the United States Patent and Trademark Office for U.S. Appl. No. 13/852,788 dated Jun. 20, 2014 (21 pages).

Office Action from the United States Patent and Trademark Office for U.S. Appl. No. 13/852,788 dated Oct. 21, 2014 (29 pages).

Final Office Action from the United States Patent and Trademark Office for U.S. Appl. No. 14/108,795 dated Apr. 6, 2015 (19 pages).

Final Office Action from the United States Patent and Trademark Office for U.S. Appl. No. 14/108,795 dated Oct. 6, 2015 (7 pages).

Final Office Action from the United States Patent and Trademark Office for U.S. Appl. No. 14/805,655 dated Dec. 17, 2015 (9 pages).

Final Office Action from the United States Patent and Trademark Office for U.S. Appl. No. 13/852,788 dated Dec. 17, 2015 (26 pages).

Final Office Action from the United States Patent and Trademark Office for U.S. Appl. No. 14/550,479 dated Mar. 9, 2016 (9 pages).

Office Action from the US Patent and Trademark Office for U.S. Appl. No. 14/550,486 dated May 20, 2016 (34 pages).

* cited by examiner

DRIVER COMPLIANCE MACHINE FOR MONITORING MULTIPLE OPERATORS

RELATED APPLICATIONS

This application is a divisional of U.S. patent application Ser. No. 14/550,486 filed on Nov. 21, 2014, which was a continuation of U.S. patent application Ser. No. 14/108,795 filed on Dec. 17, 2013, the entire contents of both applications being hereby incorporated by reference.

BACKGROUND

The present invention relates to systems and methods for monitoring and managing vehicle drivers. More particularly, embodiments of the invention relate to determining compliance with requirements governing the operation of commercial motor vehicles.

SUMMARY

Operators of commercial motor vehicles ("CMVs") are required to comply with certain regulations for operating such vehicles. For example, some operators of the CMV's are required to comply with hours-of-service regulations.

The U.S. Department of Transportation, Federal Motor Carrier Safety Administration ("FMCSA") has established a comprehensive list of regulations that professional operators of CMVs must comply with. These regulations govern operators, CMVs, and the trucking companies (sometimes called "carriers") owning the carriers. Professional operators must comply with the obligations imposed under federal and state requirements, and these requirements include not only physical and age requirements but also define the ways an operator can lose his commercial driving privileges. Trucking companies and companies having trucking operations that support their core business are typically required to evaluate and track many aspects of CMV operators and their abilities to perform job tasks such as operator qualifications (for example, operator licensing and renewal); alcohol and drug testing; accident reporting; operator training; and hiring and screening of applicants Many CMVs are equipped with electronic-on-board-recorders to record information relating to the CMVs. Some existing systems use a mobile communication device, such as a smart phone, tablet computer, or laptop computer equipped with a radio transceiver. Such a radio-transceiver equipped device provides a mechanism to send information from the vehicle to a remote location. The systems are generally designed in a "bring-your-own-device" or "BYOD" architecture such that each driver may, in general, use his or her own, off-the-shelf mobile communication device (as opposed to a particular device provided by an employer or operator/administrator of the system). Of course, the driver's mobile communication device must meet certain minimum technical requirements, such as the ability to run a particular operating system.

The mobile communication device is connected to a vehicle-installed base unit. Broadly, speaking the base unit provides information that has been read or received from the vehicle to the mobile communication device. For example, the base unit may receive data from a vehicle information bus. The mobile communication device processes the information, such as formatting it for transmission (a conditioning purpose) to a remote device, for example, via a cellular connection. In other cases, the mobile communication device may process the information for functional purposes, such as determining compliance with driver regulations. The mobile communication device also sends information to a remote location. In some instances, information processing is performed at the remote location.

The amount of vehicle data provided to a mobile device can be relatively large and, in some cases, over burden the memory and/or processing resources of the mobile device. Similarly, the relatively large amount of data transmitted from the base unit to the mobile communication device requires a relatively high bandwidth connection between the base unit and the mobile device. Meeting these memory and bandwidth requirements is difficult because, among other things, drivers may use a variety of mobile communication devices as permitted in a BYOD architecture. Even when a device meets minimum requirements, performance of the system may be unsatisfactory, particularly when compared to performance that may be achieved with mobile communication devices that possess higher performance memory, processing, and connection capabilities. Of course, even though distinctions between device types may blur, performance capabilities may also vary in view of whether a driver decides to use a mobile phone, tablet, or laptop computer.

Accordingly, in one embodiment, the invention provides a mechanism to address at least in part, some of the deficiencies in currently available BYOD driver logging and compliance systems.

In one embodiment, the invention provides a base unit installed in a vehicle wherein the base unit includes a vehicle communication module for communicating with a controller, the controller monitoring at least one operating parameter of the vehicle. The base unit also includes a transceiver and a processor configured to receive the at least one operating parameter of the vehicle from the vehicle communication module and process the at least one operating parameter to detect an event, wherein the event is used for driver compliance logging. The transceiver is configured to transmit the event to at least one external device.

In another embodiment the invention provides a method of determining compliance data based, at least in part, on at least one operating parameter of a vehicle and identification information associated with a driver of the vehicle. The method includes receiving, by a processor, at least one operating parameter of the vehicle detecting, by the processor, at least one event based on the at least one operating parameter of the vehicle and receiving identifying information for the driver associated with the vehicle. The method also includes determining, by the processor, compliance logging based, at least in part, on the detected event and the identifying information, transmitting, using a transceiver, information based on the detected event to a mobile communication device, and transmitting compliance logging to a remote server.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
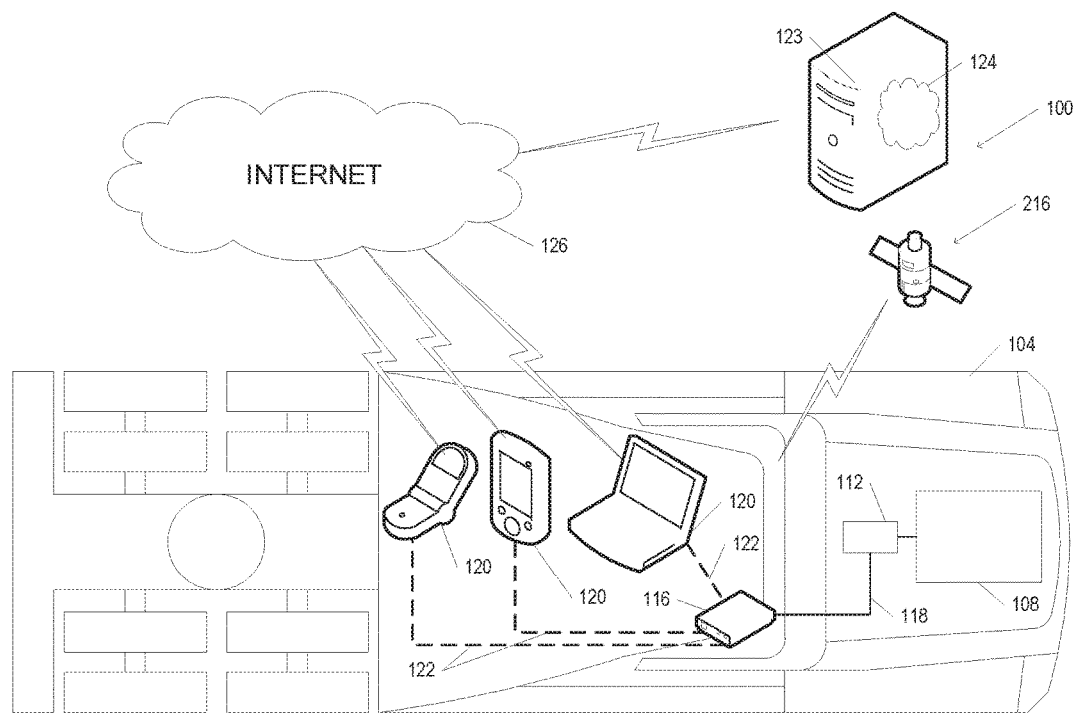
FIG. 1 schematically illustrates a driver performance monitoring system according to one embodiment of the invention.

FIG. 1 illustrates a performance monitoring system 100 for use with a vehicle 104. Although the vehicle 104 is illustrated as a commercial vehicle in the form of a tractor configured to tow a trailer (not shown), the performance monitoring system 100 can also be implemented in other types of vehicles, such as construction vehicles, agricultural equipment, and personal vehicles. The vehicle 104 includes an engine 108 that drives the vehicle 104 and is controlled by an electronic control unit ("ECU") 112. The ECU 112 monitors operating parameters of the vehicle 104 and controls the engine 108 and other parts of the vehicle 104 based on the monitored parameters. Operating parameters monitored by the ECU 112 include speed, hours of vehicle or engine operation, operating status, ignition state, trip distance, total vehicle distance, and the like.

In one embodiment, the performance monitoring system 100 includes an electronic on-board recorder ("EOBR") base unit 116, one or more external devices 120 (i.e., external to the base unit 116), and a remote server 123 running a remote host application 124. As illustrated in FIG. 1, the base unit 116 communicates with the ECU 112 through an information bus 118. The information bus 118 can conform to communication standards such as SAE J1939, SAE J1708, or other standards. The base unit 116 also communicates with the external devices 120 through a wired or wireless link 122. For example, in some embodiments, the base unit 116 communicates with the external devices 120 using short-wave radio transmissions in the ISM band from 2400 to 24800 MHz (commonly referred to as Bluetooth or IEEE 802.15.1 standard).

In some embodiments, an external device 120 is a mobile communication device, such as smart phone, a tablet computer, a laptop computer, a smart watch, or another computing device upon which software may be readily installed, that possesses the capability of wirelessly connecting to other devices, and that can be carried and moved by a user. As illustrated in FIG. 1, when the external device 120 includes a mobile communication device, the external device 120 wirelessly communicates with the remote server 123 over a communication network 126, such as a cellular network connection or the Internet (e.g., using a Wi-Fi connection).

The base unit 116 performs a plurality of functions including, for example, time keeping and data logging. In one implementation, the base unit 116 records and stores vehicle information or data for complying with Federal Motor Carrier Safety Administration ("FMCSA") regulations, such as those mentioned above from the ECU 112. Information logged by the base unit 116 is transmitted to an external device 120.

The base unit 116 is powered via a connection to a battery (e.g., a 12 volt or 24 volt vehicle battery). In some embodiments, the base unit 116 is configured to operate in a fully operational mode and a sleep mode to conserve power. When the base unit 116 is in the fully operational mode, the base unit 116 obtains vehicle information from the ECU 112. For example, information may be obtained by the base unit from the ECU 112 substantially in real time or at a predefined frequency or interval. If the base unit 116 is coupled with an external device 120 (e.g., a mobile communication device), the base unit 116 can send information regarding the vehicle 104 to the device 120.

When the base unit 116 operates in the sleep mode, the base unit 116 does not communicate with the ECU 112 and the base unit 116 operates in a manner to reduce power consumption. In some embodiments, the base unit 116 consumes no more than approximately 10 milliamps at 12 volts when operating in the sleep mode. The sleep mode allows the base unit 116 to remain operational for a longer period of time because the battery powering the base unit is not depleted as quickly as when the base unit 116 is in the fully operational mode. The base unit 116 enters sleep mode when the base unit 116 detects that the vehicle ignition state is "off." In some embodiments, the base unit 116 remains in the fully operational mode for a predetermined period of time after detecting that the vehicle ignition state is "off" before automatically switching to the sleep mode. The base unit 116 exits the sleep mode and enters into a fully operational mode when the base unit 116 detects that the vehicle's engine 108 is "on" or detects receipt of vehicle information from the ECU 112 (e.g., a communication module 250 of the base unit 116 is activated).

Figure 2:
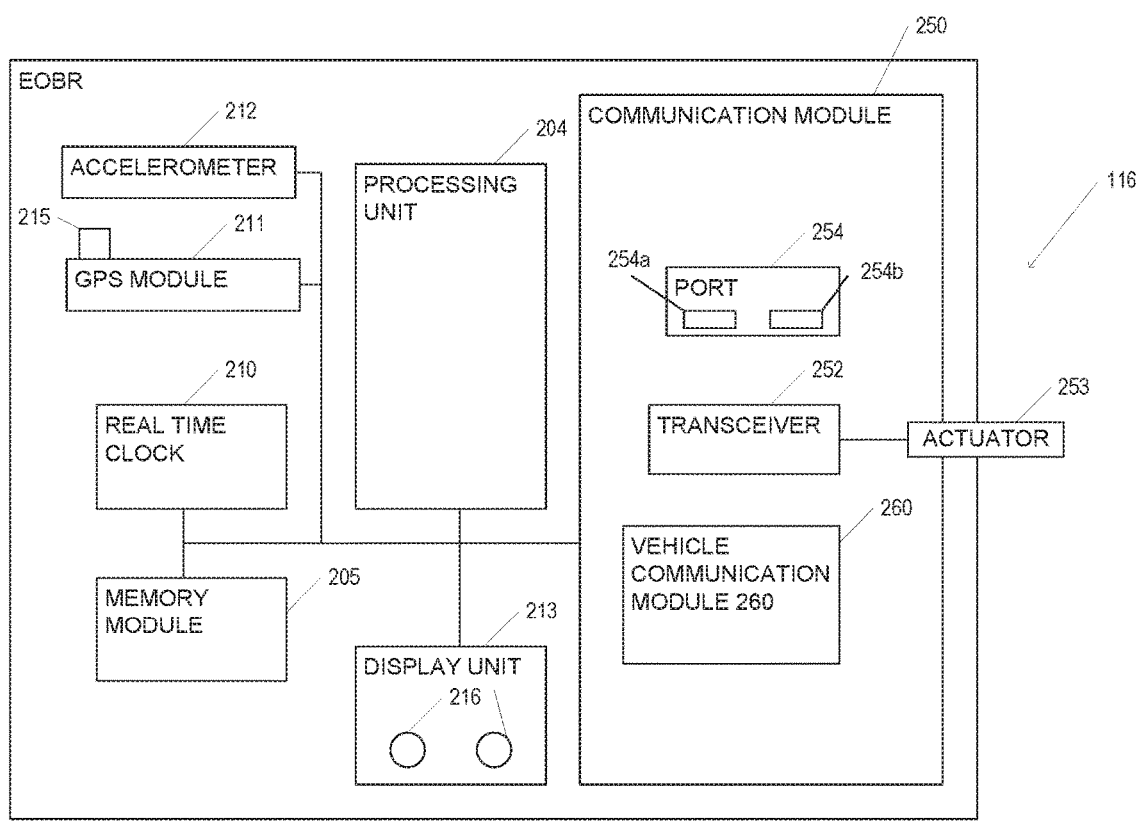
FIG. 2 schematically illustrates a base unit of the system of FIG. 1.

As shown in FIG. 2, the base unit 116 includes a processing unit (such as a microprocessor, controller, or application-specific-integrated circuit ("ASIC")) 204 and at least one memory module 205. The memory module 205 includes non-transitory computer readable medium, such as a non-volatile serial flash memory and volatile memory. As described in more detail below, the memory module 205 stores instructions that, when executed by the processing unit 204, logs vehicle data, logs data retrieval history, and processes data received from the ECU 112 and other devices and systems external to the base unit 116. Accordingly, as described herein, the base unit 116 performs particular functionality by executing instructions with the processing unit 204.

The base unit 116 also includes a real-time clock 210, a GPS module 211, an accelerometer 212, and a display unit 213. The real-time clock 210 provides a real-time clock function to allow the base unit 116 to accurately determine a time with a predetermined resolution (e.g., approximately one second). The real-time clock 210 is powered by a battery that provides power to the clock 210 even when the vehicle 104 does not provide power to the base unit 116. The base unit 116 is also configured to report that the real-time clock value is invalid if the time from the real-time clock 210 is earlier than the last firmware release timestamp for the base unit 116. If the real-time clock value is invalid, the base unit 116 can be configured to stop recording vehicle information as described above. In some embodiments, the real-time clock 210 is configured to obtain an updated time from the GPS module 211.

The GPS module 211 included in the base unit 116 includes a GPS antenna 215, which can be internal to the base unit 116. Positioning the antenna internal to the base unit 116 makes it more tamper-proof than an antenna external to the base unit 116. Based on data received by the GPS antenna 215 from one or more external satellites 216 (see FIG. 1), the GPS module 211 provides location information to the processing unit 204 regarding latitude, longitude, speed, heading, time, and a GPS information quality value. In some embodiments, the GPS module 211 updates the location information periodically in a predetermined frequency (e.g., approximately once per second). The GPS module 211 remains active when the vehicle 104 is in motion and whenever the vehicle ignition is "on." When the base unit 116 is in sleep mode, the GPS module 211 is activated periodically after a predetermined period of time to ensure that the vehicle ignition is not "on" (e.g., the vehicle 104 is not moving).

The base unit 116 uses the GPS information quality value to determine the reliability of the location information generated by the GPS module 211. Depending on the method used by the GPS module 211 to obtain the location information, the degree of reliability of the location information changes. For example, GPS modules typically provide a GPS fix quality value that designates how the location information was obtained. In general, the lower the GPS fix quality value, the lower the quality of the associated location information. For example, if the GPS module 211 receives an invalid location information or receives no information, the GPS fix quality value can be set to zero, but if the GPS module 211 uses a GPS or a standard positioning service ("SPS") to obtain location information, the GPS fix value can be set to one. Similarly, if the GPS module 211 uses differential GPS ("DGPS"), the fix value can be set to two, and if the GPS module 211 uses a precise positioning service ("PPS"), the fix value can be set to three. In some embodiments, if the GPS module 211 is unable to provide updated location information, the GPS module 211 and/or the base unit 116 uses and maintains the last known location information that is associated with a "good" GPS fix value (e.g., a fix value of one or greater). In some embodiments, when the base unit 116 transmits the last known "good" location data to an external device 120, the base unit 116 also transmits information (e.g., the GPS fix value) to the device indicating the "uncertainty" associated with the provided location data.

As noted above, the base unit 116 can receive vehicle speed information from the ECU 112. However, in some embodiments, the base unit 116 can also be configured to calculate vehicle speed information based on information received from the GPS module 211. As described in more detail below, in some embodiments, the base unit 116 can operate in a GPS-mode, where the base unit 116 accumulates information only based on information from the GPS module 211 and the accelerometer 212 and does not obtain information from the ECU 112. When the base unit 116 communicates vehicle speed information to an external device 120, the base unit 116 can be configured to indicate the source of the vehicle speed information (e.g., the ECU 112 or the GPS module 211).

The accelerometer 212 detects vehicle motion. For example, in some embodiments, the accelerometer 212 includes a three-axis accelerometer. The accelerometer 212 detects vehicle motion without the use of the GPS module 211 or other information provided by the ECU 112. Accordingly, the accelerometer 212 allows the base unit 116 to exit a sleep mode quickly and begin recording vehicle information with minimal delay. The accelerometer 212 remains operational even when the base unit 116 is in sleep mode such that the accelerometer 212 detects motion accurately and timely. Also, in some embodiments, when the accelerometer 212 senses vehicle vibration, the base unit 116 collects information from other components to confirm that the vehicle state has changed. For example, the base unit 116 checks engine revolutions per minute ("RPM"), wheel speed, and/or battery voltage using information provided by the ECU 112. The base unit 116 can also receive confirming information from the GPS module 211 that the vehicle state has changed. Once the base unit 116 has received confirming information, the base unit 116 exits sleep mode and operates in the fully operational mode.

The display unit 213 communicates information to a user of the base unit 116. For example, the display unit 213 can include one or more LEDs 216. The LEDs 216 indicate a status of the base unit 116. For example the LEDs 216 can be used to indicate whether an external device 120 connected to the base unit 116 is properly functioning (e.g., a connection status), whether signals are being communicated between the base unit 116 and the ECU 112 (e.g., a communication status), and whether signals are being communicated between the base unit 116 and an external device 120 (e.g., a mobile communication device communication status). In some embodiments, the LEDs 216 include a dimming functionality to adjust a brightness of each LED according to environmental lighting conditions. For example, the LEDs 216 can include at least one light sensing LED that determines the environmental light conditions, which is used to control the brightness of the other LEDs. The LEDs 216 can include different colored LEDs and can be configured to flash at different frequencies to signal different statuses of the base unit 116. As an alternative to or in addition to the LEDs 216, the display unit 214 can be configured to provide information to a user through other output mechanisms, such as displaying a textual message, playing an audio sound or message, providing tactile feedback (e.g., vibration), etc.

The base unit 116 also includes a communication module 250. As illustrated in FIG. 2, the communication module 250 includes a transceiver 252 for communicating data between the base unit 116 and an external device 120. The transceiver 252 can communicate with an external device 120 using a wired or wireless connection. For example, as noted above, the base unit 116 can communicate with an external device 120 using a Bluetooth connection. Accordingly, the wireless transceiver 252 can include a Bluetooth transceiver. In some embodiments, the transceiver 252 operates simultaneously with the GPS module 211.

A Bluetooth-enabled device can be configured to automatically search and discover other Bluetooth-enabled devices. The base unit 116 can include connection actuator 253 that allows a user to control when the base unit 116 becomes discoverable or searchable. For example, in some embodiments, pressing the connection actuator 253 for a predetermined period of time (e.g., three seconds) makes the base unit 116 discoverable or searchable by a Bluetooth-enabled external device 120. Also, if the base unit 116 is operating in a sleep mode, pressing the connection actuator 253 wakes up the processing unit 204 and enables communication between the base unit 116 and the external device 120. In some embodiments, the base unit 116 is also configured to automatically become discoverable or searchable for a predefined period of time after the base unit 116 is powered or reset and for a predefined period of time after the base unit 116 enters a sleep mode.

When the base unit 116 is discoverable, an external device 120 can search for, discover, and couple to the base unit 116. In some embodiments, the base unit 116 couples to the external device 120 as a slave unit. Once the base unit 116 and the external device 120 are properly coupled, the base unit 116 is no longer discoverable or searchable. Once the external device 120 is coupled to the base unit, the display unit 213 of the base unit 116 can indicate a status of the connection or coupling. For example, when the base unit 116 is discoverable or searchable, one or more of the LEDs 216 can flash, and, when the base unit 116 is coupled to the external device 120, the one or more LEDs 216 can provide a solid light. After the external device 120 and the base unit 116 are coupled, the device 120 and the unit 116 can exchange information. For example, as noted above, the base unit 116 can transmit vehicle information to the external device 120. It should be understood that even when the transceiver 264 is transmitting vehicle information to the external device 120, the base unit 116 continues to monitor and record new vehicle information from the ECU 112 and other devices and systems (e.g., the GPS module 211, the accelerometer 212, etc.).

In some embodiments, the communication module 250 also includes one or more encryption chips, modems, or both for communicating with different types of external devices. For example, the communication module 250 can include an Apple® encryption chip and a supported modem, which allows the base unit 116 to communicate with Apple devices. When the base unit 116 is coupled with an Apple® device 120 (e.g., an iPhone®, an iPad®, etc.), the communication module 250 executes a communication process (as designated by Apple®) that transmits a "live" message to the device 120 in accordance with a predetermined timing (e.g., every fifteen seconds) to keep the wireless communication (e.g., Bluetooth) established between the devices 116 and 120. The device 120 can be configured to control when the "live" message is transmitted. The base unit 116 can similarly include encryption chips and modems for other types of external devices, such as Microsoft® devices, Android® devices, Linus® devices, etc.

As illustrated in FIG. 2, the communication module 250 also includes a port 254 for physically coupling the external device 120 to the base unit 116. The port 254 allows diagnostic data to be transmitted between the external device 120 and the base unit 116. In some embodiments, the port 254 includes one or more universal serial port ("USB") connections. For example, the port 254 can include a first USB connection 254a and a second USB connection 254b. The first connection 254a is used to transmit diagnostic data regarding the base unit 116 to the external device 120 but does not provide a charging current to the external device 120. Therefore, the second connection 254b is used to provide a charging current to the external device 120. By proving two separate connections, one for charging and one for data transmission 364, the base unit 116 does not need to include an isolated DC power supply.

In some embodiments, when an external device 120 is connected to the second connection 254b, the external device 120 receives a reference voltage over the second connection 254b. The reference voltage allows the external device 120 to recognize the second connection 254b as an acceptable charging port. The second connection 254b provides power to the external device 120 when the vehicle's engine is on or operating or when the base unit 116 is reset. Also, in some embodiments, the second connection 254b continues charging the external device 120 for a predetermined period of time (e.g., approximately 10 minutes) after the vehicle's ignition is turned "off" or the base unit 116 is reset. The predetermined period of time can be manually adjusted by the user if desired. If the battery voltage provided to the base unit 116 drops below a predetermined value (e.g., approximately 11 volts), the second connection 254b can also be configured to stop supplying power. If the battery voltage increases above the predetermined value again, the second connection 254b resumes supplying power. Also, in some embodiments, when the base unit 116 enters the sleep mode, the second connection 254b stops providing power to the external device 120.

The diagnostic data transmitted through the port 254 can pertain to the base unit 116 (as compared to the ECU 112 or other components of the vehicle 104). Therefore, a user can couple their external device 120 to the port 254 to diagnose a malfunction occurring with the base unit 116. Similarly, the port 254 allows the base unit 116 to be field-programmable, that is, the base unit 116 can be reconfigured, modified, or upgraded using an external device 120.

Figure 3:
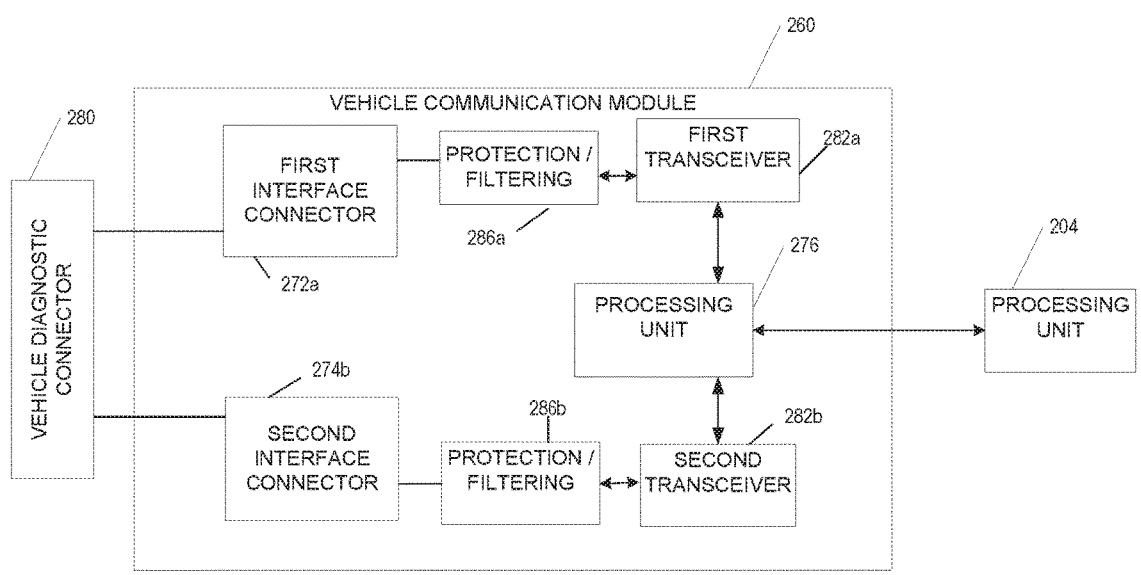
FIG. 3 schematically illustrates a vehicle communication module of the base unit of FIG. 2.

The communication module 250 also includes a vehicle communication module 260 for communicating with the ECU 112. As illustrated in FIG. 3, the vehicle communication module 260 includes a processing unit (such as a microprocessor, controller, or application-specific-integrated circuit ("ASIC")) 276 configured to manage communication between the base unit 116 and the ECU 112. For example, the processing unit 276 decodes and buffers data transmitted between the base unit 116 and the ECU 112 and communicates with the processing unit 204.

To connect with the ECU 112, the vehicle communication module 260 includes a plurality of communication interfaces 272 to accommodate various types of vehicles. For example, as noted above, the ECU 112 communicates over the information bus 118, which can conform to communication standards such as SAE J1939, SAE J1708, or other standards. In some embodiments, diagnostic information is transmitted over the information bus 118. Therefore, the bus 118 can be considered an on-board diagnostic ("OBD") bus that includes a diagnostic connector 280 that allows external devices to connect to and exchange data with the bus 18. Different types of vehicles can include different types of connectors 280 for connecting to the bus 118. For example, a standard passenger vehicle may include a SAE J1939 interface connector, but a commercial motor vehicle may include a SAE J1708 interface connector. Therefore, as illustrated in FIG. 3, the base unit 116 can include a first communication interface 272a for coupling the unit 116 to a first type of information bus (e.g., a SAE J1939 bus) and a second communication interface 272b for coupling the unit 116 to a second type of communication bus (e.g., a SAE J1708 bus). Also, in some embodiments, the base unit 116 includes more than two communication interfaces 272. For example, the base unit 116 can include a SJ1708 interface, a SAE J1939 interface, a SAE J1850 PWM interface, a SAE J1850 VP interface, an ISO 9141-2 interface, and a SAE J2284 interface. The plurality of communication interfaces 272 allows the base unit 116 to communicate with a variety of different vehicles and makes the base unit 116 portable in that it can be removed from a first vehicle and used in second vehicle even if the second vehicle does not include the same type of diagnostic bus or connector.

The vehicle communication module 260 also includes at least one transceiver 282 for managing communication via the communication interfaces 272. In some embodiments, the module 260 includes a transceiver 282 for each interface 272. For example, as illustrated in FIG. 3, the module 260 can include a first transceiver 282a and a second transceiver 284b. The first transceiver 282a can conform to the standard associated with the first communication interface 272a (e.g., SAE J1708) and transmits and receives data through the first communication interface 272a. Similarly, the second transceiver 282b conforms to the standard associated with the second communication interface 272b (e.g., SAE J1939) and transmits and receives data through the second communication interface 272b. The two transceivers 282 and 284 can be configured to obtain data from the vehicle diagnostic connector 280 individually or simultaneously. It should be understood that in other embodiments, the module 260 includes a transceiver 282 that conforms to more than one standard and, therefore, and communicate through more than one of the communication interfaces 272.

The vehicle communication module 260 can also include one or more protection and filtering modules 286 that filters received data to reduce or eliminate data noise. The protection and filtering modules 286 can also be configured to ensure that received data has a predetermined amplitude range that is acceptable to the processing unit 276. Thus, amplitude surges in data can be detected and the processing unit 276 can be protected. In some embodiments, as illustrated in FIG. 3, the module 260 includes a protection and filtering module 286 for each transceiver 282 (e.g., a first protection and filtering module 286a and a second protection and filtering module 286b).

Figure 4:
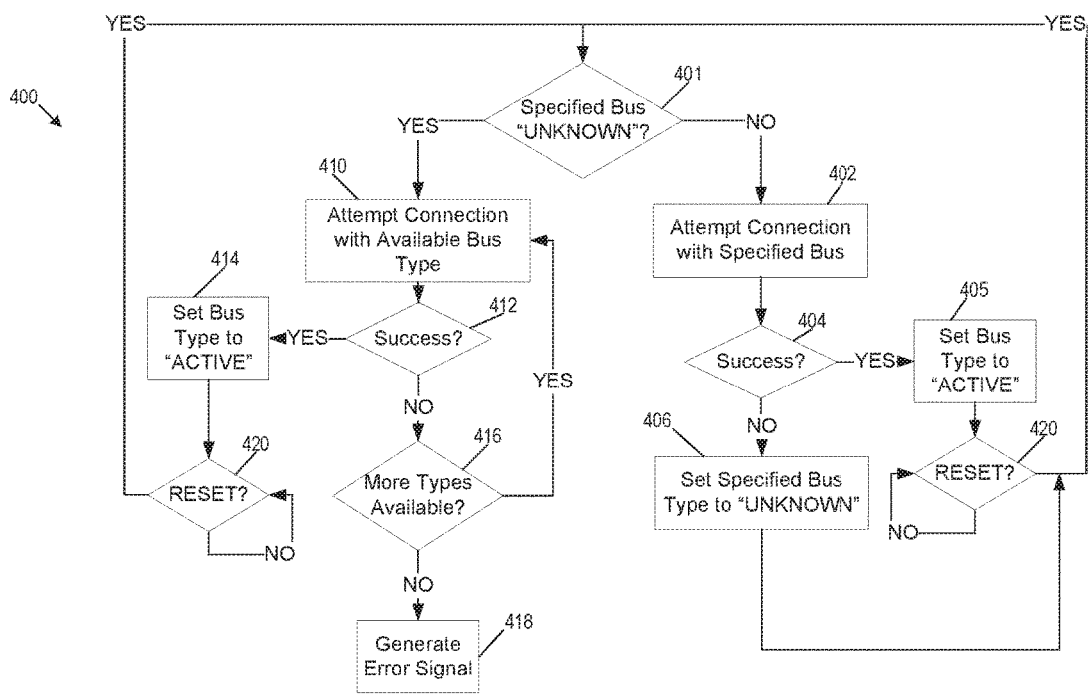
FIG. 4 is a flowchart illustrating a bus search mode implemented by the base unit of FIG. 2.

FIG. 4 illustrates a method 400 for coupling the base unit 116 to the ECU 112 using the vehicle communication module 260. The information bus type (i.e., the particular communication interface 272) used to communicate with the ECU 112 can be manually specified by a user. For example, the user can access a drop-down menu provided by the external device 120 to select a particular bus type. If a user does not specify a bus type, the specified bus type can default to "UNKNOWN" or a similar default setting. Accordingly, if the user specifies a particular bus type (at block 402), the vehicle communication module 260 attempts to communicate with the ECU 112 using the specified bus type (at block 402). If the communication attempt is successful (at block 404), the module 260 uses the bus to exchange information with the ECU 112 and sets the specified bus type as the "ACTIVE" type (e.g., by saving an identifier of the specified type to an "ACTIVE" data field or variable) (at block 405). Otherwise, if the communication attempt fails (at block 404), the module 260 can issue an error signal on the display 214. Alternatively, the module 260 can be configured to reset the specified bus type to "UNKNOWN" (at block 406), which as described below causes the module 260 to enter an automatic bus search mode.

As illustrated in FIG. 4, if a specific bus type is not defined by the user (e.g., if the bus type is defined as "UNKNOWN") (at block 401), the vehicle communication module 260 enters a bus search mode that automatically determines the bus type to use for communicating with the ECU 112. In particular, the module 260 attempts to communicate with the ECU 112 using one of the standards associated with the plurality of the communication interfaces 272 (at block 410). For example, in some embodiments, the module 260 maintains a list of standards and an order of using or testing each standard. In particular, the module 260 can be configured to initially attempt communication using the first communication interface 272a (e.g., the J1708 communication interface and associated transceiver). In other embodiments, the module 260 can be configured to initially attempt communication using the last bus type recorded as "ACTIVE" (see block 405 above). If the module 260 successfully establishes communication with the initially-selected bus type (at block 412), the vehicle communication module 260 uses the selected bus to exchange information with the ECU 112 and sets the specified bus type as the "ACTIVE" type (at block 414).

Alternatively, if the communication attempt fails (at block 412), the module 260 determines whether there are additional bus types to try (at block 416). If there are no additional types to attempt, the base unit 116 displays an error signal on the display unit 213 (at block 418). In some embodiments, the module 260 can be configured to re-try connections with one or more of the available bus types before generating an error signal (e.g., try connecting with each bus type at least twice before generating the error signal). Otherwise, while there are additional bus types to try (at block 416), the module continues to attempt a connection with the ECU 112 over one of the communication interfaces 272 (at block 410).

As illustrated in FIG. 4, if the base unit 116 is reset (at block 420), the module 260 can be configured to automatically enter the bus search mode as described above. For example, in some embodiments, when the base unit 116 is reset, the specified bus type can default to "UNKNOWN." Also, any time a user specifies a bus type different than the currently-set bus type, the base unit 116 can attempt to communicate using the specified bus type and, optionally, can enter the bus search mode if communication with the specified bus type fails (see blocks 404 and 406). In addition, to manually initiate the bus search mode, a user can set the bus type to "UNKNOWN" or a similar default setting. Furthermore, in some embodiments, when the voltage of the battery powering the base unit 116 drops below a predetermined threshold (e.g., approximately 11 volts), the vehicle communication module 260 changes the number or order of bus types used for communication attempts. For example, when the battery voltage drops below the predetermined threshold, the base unit 116 can be configured to only attempt to communicate through a J1939 information bus or a J1708 information bus even if other bus types are available.

During operation, the base unit 116 collects information from the ECU 112 (e.g., over the vehicle communication module 260) and transmits the information from the ECU 112 to at least one external device 120 (e.g., using the transceiver 252). In particular, the base unit 116 can be configured to obtain vehicle data from the ECU 112 at a predetermined frequency. Obtained information is stored to the memory module 205. When an external 120 sends a request for data from the base unit 116, the base unit 116 logs the request, retrieves the data from the memory module 205, and communicates the retrieved data to the external device 120. The base unit 116 also logs other information related to the request to the memory module 205, such as the time span over which data was retrieved, the time the data was retrieved or time-stamped, and the size of the data that was delivered. Once the data is transmitted to the external 120, the data remains in the memory module 205 for a predetermined time period to prevent any loss of data. In some embodiments, once the data is transferred to the external device 120, the data is marked extracted, transmitted, downloaded, or expired. Therefore, the memory module 205 stores a log of vehicle data and a log of data retrieval history. In some embodiments, the memory module 205 also stores a unique identifier to identify a particular base unit 116. The unique base unit identifier can be modified by an external device 120 that communicates with the base unit 116 (e.g., a user operating the external device). In other embodiments, the unique base unit identifier is assigned to the base unit 116 during the manufacturing process and cannot be changed.

If at any time during operation of the base unit 116, the memory module 205 is full, the display unit 213 signals that the memory is full and the base unit 116 stops recording vehicle data until the stored vehicle data is retrieved by the external device 120. Once the vehicle data is transferred to the external device 120, the transferred data can be marked extracted, transmitted, downloaded, or expired and the memory containing this data can be overridden with new data.

In some embodiments, the base unit 116 is configured to operate in a GPS-only mode. When the base unit 116 operates in a GPS-only mode, the vehicle communication module 260 does not need to be connected to the diagnostic connector 220 of the vehicle 104. When the base unit 116 operates in the GPS-only mode, the vehicle speed is obtained exclusively from the GPS module 211 and the accelerometer 212. The base unit 116 also generates a synthetic odometer reading based on information from the GPS module 211 and the accelerometer 212. Similarly, the ignition switch state is derived using information from the accelerometer 212 and the GPS module 211. In some embodiments, when the base unit 116 operates in the GPS-only mode, vehicle information generated by the base unit 116 is transmitted to an external device 120 only when specifically requested from the external device 120 (e.g., upon a request for vehicle information collected during the GPS-only mode.

As noted above, the base unit 116 stores or accumulates information and provides the accumulated information to an external device 120. In particular, the base unit 116 can be configured to detect certain types of events based on the accumulated information. For example, the base unit 116 can be configured to detect events such as vehicle stop, ignition on and off state changes, base unit 116 resets, when the base unit 116 enters and exits sleep mode, faults, if the vehicle communication module 260 receives any information about active diagnostic trouble codes, if the vehicle communication module 260 receives information about a malfunction indicator lamp, if there is a change in operator identification, or if the vehicle 104 is moving. The base unit 116 can also be configured to store information regarding operation of the base unit 16, such as the number of times the base unit 116 has been reset, the total time the base unit 116 has been operating, the total number of trips the base unit 116 has monitored, the total time the ignition has been detected to be on, the total time the ignition has been detected to be off, total number of data packets transmitted and received from the external device 120, and the like.

Figure 5:
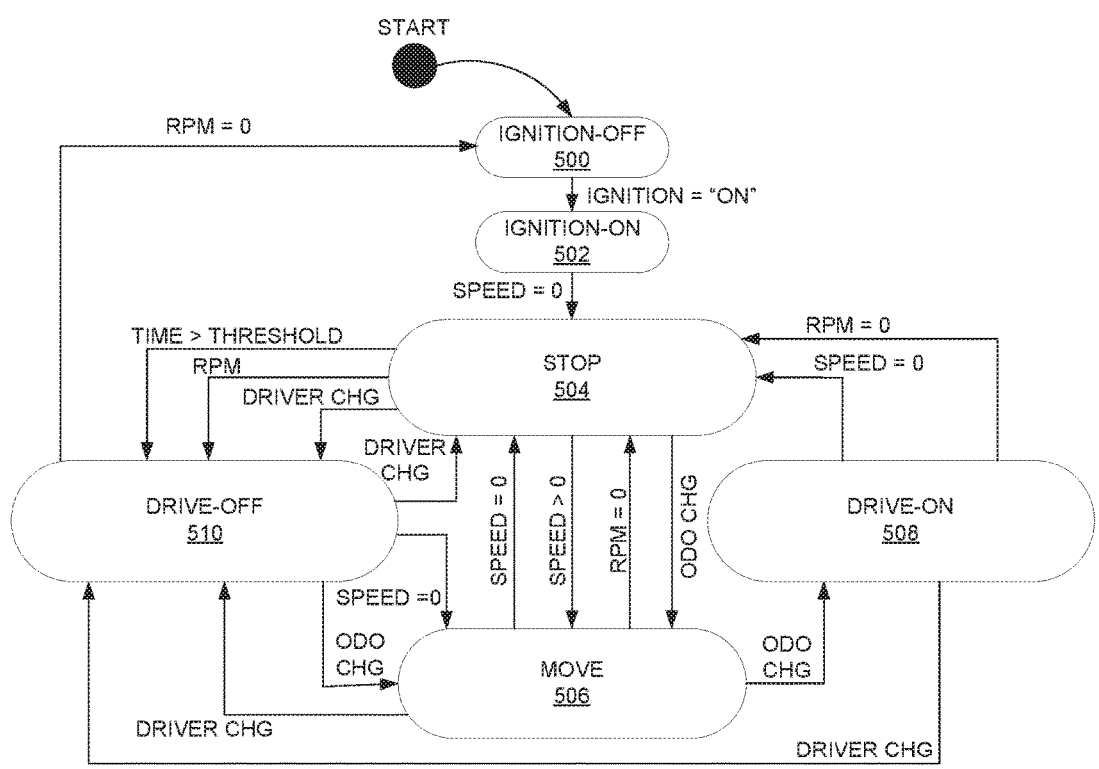
FIG. 5 schematically illustrates a state machine implemented by the base unit of FIG. 2.

For example, FIG. 5 schematically illustrates how the base unit 116 detects different events using a state machine. The state machine allows the processing unit 204 to determine when the vehicle 104 starts and stops moving, when an operator is heading to a destination, when an operator arrives at a destination, and similar information. This information is then used to determine compliance data, specifically, hours-of-service associated with a particular operator or driver of the vehicle. As illustrated in FIG. 5, in some embodiments, the state machine tracks six different states associated with different vehicle events: an "ignition-off" state 500, an "ignition-on" state 502, a "stop" state 504, a "move" state 506, a "drive-on" state 508, and a "drive-off" state 510.

When a base unit 116 is first coupled with the vehicle 104, the base unit 116 sets the vehicle state to the "ignition off" state 500. In some embodiments, whenever the base unit 116 sets the vehicle state to a new state, the base unit 116 logs information regarding the event that caused the state change (e.g., a time/date, a detected event causing the change, etc.). If, while in the "ignition off" state 500, the base unit 116 detects that the vehicle's ignition has been turned "on," the base unit 116 changes the vehicle state to the "ignition on" state 502 and stores associated information. In some embodiments, detecting that the vehicle's ignition is "on" includes detecting an engine RPM greater than zero, which indicates that the vehicle is moving.

While in the "ignition on" state 502, the base unit 116 changes the vehicle state to the "stop" state 504 when the vehicle speed is zero. As illustrated in FIG. 5, from the "stop" state 504, the vehicle state can transition to the "drive-off" state 510 or the "move" state 506. The base unit 116 transitions to the "drive-off" state 510 when the base unit 116 detects that the vehicle 104 has been in a "stop" state for a period of time that exceeds a predetermined drive-stop threshold (e.g., approximately 10 minutes). The base unit 116 can also transition to the "drive-off" state 510 from the "stop" state 504 when the base unit 116 the engine RPM changes to zero or when the operator associated with the vehicle 104 changes. As described above, an operator can use a connected external device 120 to signal when he or she is starting a driving session with the vehicle 104. The base unit 116 transitions from the "stop" state 504 to the "move" state 506 when the vehicle speed becomes non-zero or when an odometer reading changes by more than a predetermined "drive start" threshold (e.g., approximately one mile).

From the "drive off" state 510, the base unit 116 can transition to the "stop" state 504, the "move" state 506, or the "ignition-off" state 500. The base unit 116 transitions to the "ignition-off" state 500 when the engine RPM remains at zero for a predetermined amount of time. Similarly, the base unit transitions to the "stop" state 504 when a new operator is associated with the vehicle 104. Conversely, from the "drive off" state 510, the base unit 116 transitions to the "move" state 506 when the base unit 116 detects that the vehicle speed becomes non-zero or when the odometer reading changes by more than the predetermined "drive-start" threshold (e.g., approximately one mile).

From the "move" (block 392) state, the base unit 116 can transition to the "stop" state 504, the "drive-off" state 510, or the "drive-on" state 508. In particular, the base unit 116 transitions to "drive-off" state 510 when a new operator is associated with the vehicle 104. Alternatively, the base unit 116 transitions from the "move" state 506 to the "stop" state 504 when the vehicle speed is zero or when the engine RPM is zero. From the "move" state 506, the base unit 116 can also transition to the "drive-on" state 508 when the odometer reading changes by more than the predetermined "drive-start" threshold (e.g., approximately one mile).

From the "drive-on" state 508, the base unit 116 can transition to the "stop" state 504 or the "drive-off" state 510. In particular, the base unit 116 transition to the "stop" state 504 when the vehicle speed is zero or when the engine RPM is zero. Similarly, the base unit transitions to "drive-off" state 510 from the "drive-on" state 508 when a new operator is associated with the vehicle 104.

In addition to the events tracked by the state machine, the base unit 116 can also be configured to detect driving events such as engine over-speed, vehicle over-speed, hard-breaking, and start driving and end driving events. The base unit 116 includes predetermined thresholds to monitor and detects these events. For example, the base unit 116 can detect an engine over-speed event when the engine speed value is greater than a predetermined "engine-over-speed" threshold. Similarly, the base unit 116 can detect a vehicle over-speed event when the vehicle speed exceeds a predetermined "vehicle-over-speed" threshold. These events are stored in the base unit 116 like other events tracked by the state machine and can be transmitted to the external device 120. Also, in some embodiments, when the base unit 116 detects these events, the base unit 116 also stores corresponding information, such as an operator associated with the vehicle 104 during the event, time the event occurred, date the event occurred, location where the event occurred, and the like.

As noted above, the base unit 116 detects some of the events by comparing received vehicle information to a threshold. In some embodiments, the base unit 116 includes multiple sets of thresholds. For example, the base unit 116 can maintain (e.g., in the memory modules 205) different thresholds for different operators. In particular, the base unit 116 can store a first set of thresholds associated with a particular operator and a second set of thresholds associated with all other operators. Accordingly, different events can be detected and tracked by the base unit 116 depending on the particular operator performing a particular vehicle operation. In some embodiments, the different thresholds can also be used to effectively disable particular vehicle checks. For example, by setting certain thresholds to values that typically will never be reached, the associated events are never recorded. Therefore, in some embodiments, only particular events (e.g., vehicle over-speed events, hard-braking events, etc.) are only detected and stored when a particular driver is operating the vehicle 104.

By using the state machine, the base unit 116 processes the data received from the ECU 112 prior to transmitting the data to the external device 120. In particular, rather than sending discrete operating parameters of the vehicle 104, the base unit 116 detects events based on the discrete operating parameters. This reduces the overall amount of data sent to the external device 120. As described above, in one embodiment, the base unit 116 uses a state machine that transitions between states based on the discrete operating parameters. Accordingly, by processing the discrete operating parameters into events, the base unit 116 also reduces some of the processing required by the external device 120. Furthermore, because the processing performed by the base unit 116 reduces the amount of data transmitted to the external device 120, the bandwidth requirements between the base unit 116 and external device 120 are reduced. The storage requirements of the external device are also reduced. In addition, the customizable thresholds described above for the state machine can be used to further process discrete operating parameters to reduce the amount of data transmitted to and stored by the external device 120.

As described above, the external device 120 receives data from the base unit 116. The external device 120 can include a software application configured to receive the data from the base unit 116 and transmit the data to the remote host application 124. The software application can also be configured to generate one or more graphical user interfaces ("GUIs") that allow a user of the external device 120 to view and manage data processed by the system 100. The software can also be configured to display histograms or specialized trip reports for specific operators or for specific trips.

The remote host application 124 receives information from the base unit 116 through the external device 120. The remote host may be configured to store logs of the events detected by the base unit 116, and calculate driving parameters based on the logs. For example, the remote host application 124 can calculate hours-of-service information for a particular operator and can alert the operator (or the operator's manager, supervisor, etc.) any violations (e.g., violations of FMCSA rules). For example, the remote host application 124 can be configured to provide a graphical user interface that users can access using a computing device (e.g., a desktop computer, a laptop computer, a tablet computer, a smart phone, a smart watch, etc.). For example, a user can access the remote host application 124 using a standard browser application or a dedicated special-purpose application executed by the computing device. The GUI provided by the remote host application 124 allows users to view logs collected by the application 124, parameters calculated by the remote host application 124, and alerts generated by the remote host application 124.

Thus, the invention provides, among other things, a base unit configured to determine vehicle events and to transmit the vehicle events to an external device. The external device is configured to transmit driver and vehicle information to a remote server. It should be understood that although the external device is described as a mobile communication device, in some embodiments, the external device is the remote server and the base unit is configured to communicate, as described above, with the remote server without using a mobile communication device as an intermediary.

Various features and advantages of the invention are set forth in the following claims.

What is claimed is:
1. A base unit configured to be installed in a vehicle having an engine, the base unit comprising:
    a vehicle communication module configured to communicate with a vehicle controller that monitors a vehicle operating parameter;
    a transceiver;
    a memory device that stores a first threshold of the vehicle operating parameter associated with a first vehicle operator and that stores a second threshold of the vehicle operating parameter associated with a second vehicle operator, wherein the second threshold is greater than the first threshold;
    a processor electrically connected to the transceiver and to the memory, the processor configured to
        receive data corresponding to the vehicle operating parameter;
        determine that a driving event has occurred when the received vehicle operating parameter data exceeds the first threshold of the vehicle operating but does not exceed the second threshold of the vehicle operating parameter; and
    wherein the transceiver is configured to transmit data to an external device when the driving event occurs, whereby the amount of data transmitted to the external device is reduced and whereby the processing and storage requirements of the external device are also reduced.

2. The base unit of claim 1, wherein the vehicle operating parameter is vehicle speed.

3. The base unit of claim 2, wherein the memory device stores additional information about the first vehicle operator and the time corresponding to the vehicle over-speed driving event.

4. The base unit of claim 2, wherein the memory device stores a value for the second threshold that is sufficiently large to thereby disable a determination by the processor that a vehicle over-speed driving event has occurred for the second vehicle operator.

5. The base unit of claim 1, wherein the vehicle operating parameter is engine speed.

6. The base unit of claim 5, wherein the memory device stores additional information about the first vehicle operator and the time corresponding to the engine over-speed driving event.

7. The base unit of claim 5, wherein the memory device stores a value for the second threshold that is sufficiently large to thereby disable a determination by the processor that the engine over-speed driving event has occurred for the second vehicle operator.

8. The base unit of claim 1, wherein the vehicle operating parameter is hard braking.

9. The base unit of claim 8, wherein the memory device stores additional information about the first vehicle operator and the time corresponding to the hard braking driving event.

10. The base unit of claim 8, wherein the memory device stores a value for the second threshold that is sufficiently large to thereby disable a determination by the processor that a hard braking driving event has occurred for the second vehicle operator.

11. The base unit of claim 1, the memory device stores a value for the second threshold that is sufficiently large to thereby disable a determination by the processor that a driving event has occurred for the second vehicle operator.

12. A method of determining compliance data based, at least in part, on an operating parameter of a vehicle, the method comprising:
   storing, using a memory device of a base unit installed in the vehicle, a first threshold of the vehicle operating parameter associated with a first vehicle operator and
   storing, using the memory device, a second threshold of the vehicle operating parameter associated with a second vehicle operator, wherein the second threshold is greater than the first threshold;
   receiving data corresponding to the vehicle operating parameter;
   determining, using a processor in the base unit and electrically connected to the memory device, that a driving event has occurred when the received vehicle operating parameter data exceeds the first threshold of the vehicle operating parameter but does not exceed the second threshold of the vehicle operating parameter; and
   transmitting, using a transceiver electrically connected to the processor, the driving event to an external device when the driving event occurs, whereby the amount of data transmitted to the external device is reduced and whereby the processing and storage requirements of the external device are also reduced.

13. The method of claim 12, wherein the vehicle operating parameter is vehicle speed.

14. The method of claim 13, further comprising:
   storing, using the memory device, additional information about the first vehicle operator and the time corresponding to the vehicle over-speed driving event.

15. The method of claim 13, wherein the storing includes storing a value for the second threshold that is sufficiently large to thereby disable a determination by the processor that a vehicle over-speed driving event has occurred for the second vehicle operator.

16. The method of claim 12, wherein the vehicle operating parameter is engine speed.

17. The method of claim 16, further comprising:
   storing, using the memory device, additional information about the first vehicle operator and the time corresponding to the engine over-speed driving event.

18. The method of claim 16, wherein the storing includes storing a value for the second threshold that is sufficiently large to thereby disable a determination by the processor that the engine over-speed driving event has occurred for the second vehicle operator.

19. The method of claim 12, wherein the vehicle operating parameter is hard braking.

20. The method of claim 19, further comprising:
   storing, using the memory device, additional information about the first vehicle operator and the time corresponding to the hard braking driving event.

21. The method of claim 10, wherein the storing includes storing a value for the second threshold that is sufficiently large to thereby disable a determination by the processor that a hard braking driving event has occurred for the second vehicle operator.

22. The method of claim 12, wherein the storing includes storing a value for the second threshold that is sufficiently large to thereby disable a determination by the processor that a driving event has occurred for the second vehicle operator.

* * * * *